United States Patent
Cottrell

(10) Patent No.: US 6,502,758 B2
(45) Date of Patent: Jan. 7, 2003

(54) ELECTRONIC DEVICE FOR REGULATING AND CONTROLLING AMBIENT TEMPERATURES, AND RELATIVE SETTING METHOD

(75) Inventor: Brian J. Cottrell, Tavistock (GB)

(73) Assignee: Invensys Controls Italy Srl, Pieve D'Alpago (IT)

( * ) Notice: Subject to any disclaimer, the term of this patent is extended or adjusted under 35 U.S.C. 154(b) by 0 days.

(21) Appl. No.: 09/901,039

(22) Filed: Jul. 10, 2001

(65) Prior Publication Data

US 2002/0005435 A1 Jan. 17, 2002

(30) Foreign Application Priority Data

Jul. 11, 2000 (IT) .................................. UD2000A000133

(51) Int. Cl.[7] .............................................. G05D 27/00
(52) U.S. Cl. ...................................... 236/46 R; 236/51
(58) Field of Search ................................ 236/46 R, 51, 236/94; 219/720; 165/238

(56) References Cited

U.S. PATENT DOCUMENTS

| | | | | |
|---|---|---|---|---|
| 4,277,784 A | * | 7/1981 | Hyltin ........................ | 236/47 |
| 4,730,941 A | * | 3/1988 | Levine et al. ................ | 236/94 |
| 4,755,646 A | * | 7/1988 | Fowler ....................... | 200/37 A |
| 4,819,714 A | | 4/1989 | Otsuka et al. ............... | 165/12 |
| 5,097,671 A | * | 3/1992 | Jeong-Hun ................... | 236/51 |
| 5,115,967 A | | 5/1992 | Wedekind | |
| 5,197,666 A | | 3/1993 | Wedekind | |
| 5,230,467 A | * | 7/1993 | Kubsch et al. .............. | 236/94 |
| 5,354,067 A | * | 10/1994 | Junemann .................... | 273/371 |
| 5,361,981 A | * | 11/1994 | Albert et al. ............... | 165/53 |
| 5,590,831 A | * | 1/1997 | Manson et al. ............... | 236/51 |
| 5,607,611 A | * | 3/1997 | Lee .......................... | 200/13 |
| 5,839,654 A | * | 11/1998 | Weber ....................... | 236/47 |
| 5,873,519 A | * | 2/1999 | Beilfuss ..................... | 236/46 R |
| 5,927,599 A | * | 7/1999 | Kath ......................... | 165/205 |
| 5,937,942 A | | 8/1999 | Bias et al. | |
| 6,226,996 B1 | * | 5/2001 | Weber et al. ................ | 236/51 |
| 6,334,317 B1 | * | 1/2002 | Bougauchi et al. .......... | 236/51 |

FOREIGN PATENT DOCUMENTS

| | | |
|---|---|---|
| DE | 19840552 A | 3/2000 |
| EP | 0591628 | 4/1994 |
| EP | 0866388 A | 9/1998 |
| EP | 0866396 | 9/1998 |
| EP | 0978692 A | 2/2000 |
| WO | WO 98/37364 | 8/1998 |

OTHER PUBLICATIONS

International Search Report from European Patent Office.

* cited by examiner

Primary Examiner—William E. Tapolcai
(74) Attorney, Agent, or Firm—McDermott, Will & Emery

(57) ABSTRACT

Electronic device operable by an user for regulating and controlling ambient parameters, such as ambient temperature, comprising a processing unit, a display device for displaying selectable control functions and setting parameters related to a set of desired ambient conditions and a selection/control unit for selecting by the user at least one control function or setting parameter from among a set of displayed control functions or setting parameters. The device comprises an interactive display of a dot matrix type able to display to a user variable indications comprising at least the specific control function associated with each of said selection/control unit according to the specific selection made by the user.

39 Claims, 8 Drawing Sheets

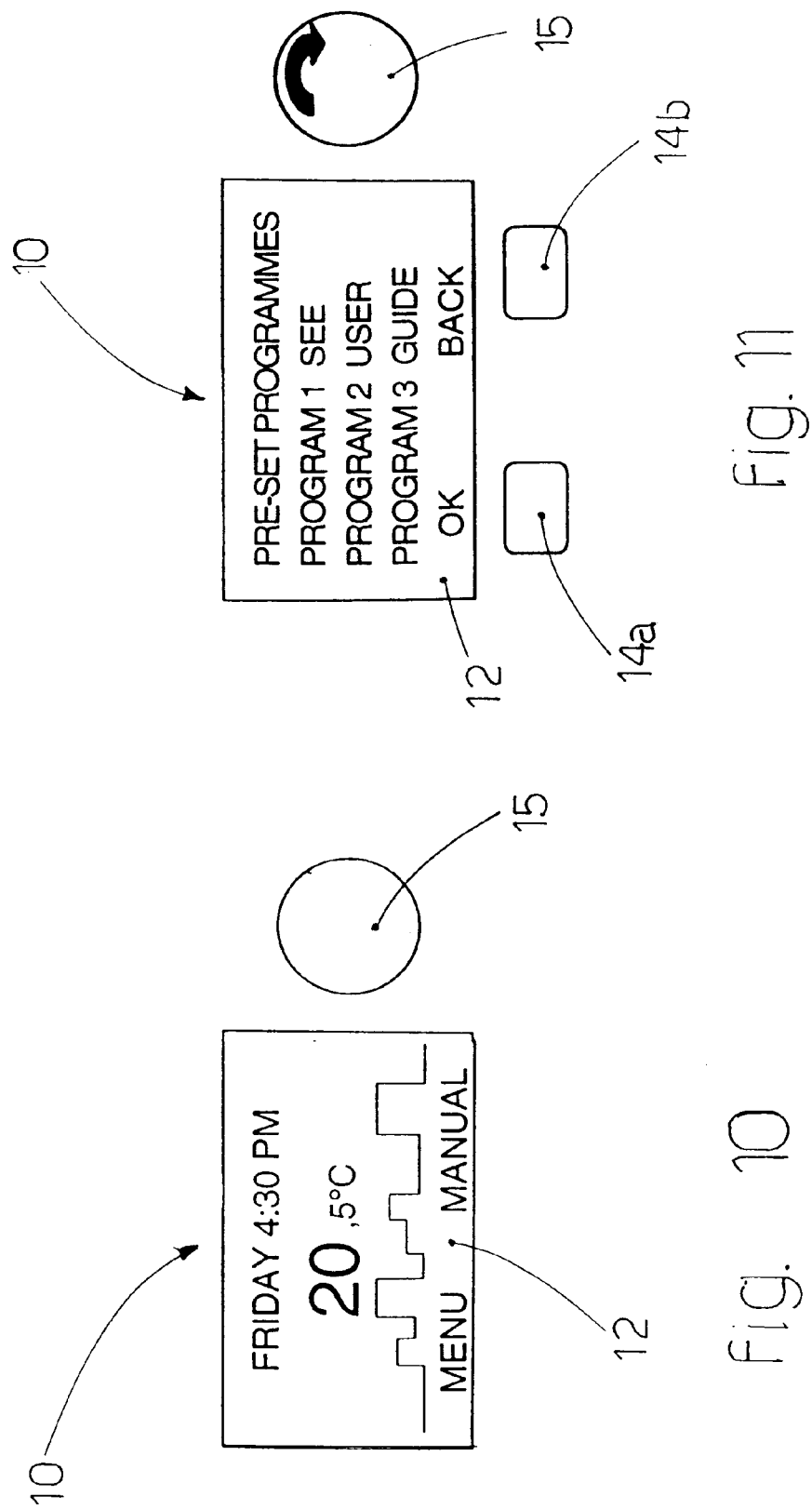

ELECTRONIC DEVICE FOR REGULATING AND CONTROLLING AMBIENT TEMPERATURES, AND RELATIVE SETTING METHOD

FIELD OF THE INVENTION

This invention concerns an electronic device for regulating and controlling ambient temperatures.

The invention also concerns a setting method which uses the electronic device.

The invention is applied in the field of electronic devices, known as thermostats, used generally in the household to set daily and/or weekly programs for conditioning, heating and/or cooling inside a house, public premises or similar.

Even though the device according to the invention is applied preferentially as a thermostat for residential/domestic use, the invention can also be used as a regulator and/or measurer to control and govern parameters other than the temperature, such as humidity, in the commercial field of conditioning and heating.

BACKGROUND OF THE INVENTION

The state of the art includes programming devices used, for example, in houses or public premises to condition the development of the ambient temperature in the course of a determined period of time. These programming devices comprise at least an intelligent unit, a memory able to memorize defined programs of heating or cooling, and an interface which allows a user to first set and later modify the heating and cooling programs.

The intelligent unit is also suitable to receive input signals relating to the values of ambient temperature by means of appropriate sensors and/or transducers, and to condition the activation of a heating or cooling unit in the event that the values of ambient temperature detected differ from the programmed values for that specific time period.

The programming device normally comprises a clock to measure the time and a display to display at least the temperatures set, the actual temperatures detected and the date (normally day of the week and time).

In recent years, such programming devices have become ever more evolved and able to allow more and more articulated and complex programming, in order to give the user very different programming possibilities, and thus to satisfy very specific requirements.

The programming devices, or thermostats, at present on the market therefore allow one to set several different programs, for example differentiating between working days and weekends; or they allow a specific programming, day by day, over 24 hours, for the whole week; or they allow to set various cooling or heating programs on a seasonal, monthly or weekly basis.

Parallel with the development of the functions and options of such devices, we have not seen an equal effort on the part of the producers to simplify the commands and make them easier for the user to understand.

It must be considered that these programming devices are very commonly used in a large number of houses, and that they may be used by people, who are not very familiar with electronic appliances and with programming procedures/systems. The devices are also used rarely, and often the commands which appear on the display are in a single language, almost always English, which not everybody understands.

The displays used are usually of the "static" type, with icons and segments, and therefore are not interactive with the user; moreover, conventional devices almost always require a large number of keys, each one specialised according to function.

Therefore, even though they may not be completely lacking in general knowledge of informatics and electronics, users are often obliged to consult the related instruction booklet (which is not always completely understandable), and the potential of the programming device can almost never be entirely exploited.

WO-A-98/37364 discloses a wireless programmable digital thermostat system comprising a plurality of transmitter units and a receiver unit for a thermostat system which includes a plurality of environmental control apparatus.

The receiver unit includes a controller adapted to be programmable in response to the input signals according to a plurality of programming modes.

The controller has a LCD display of a "static" type comprising a number of fixed segments and icons placed in fixed positions (this kind of display is called also "custom" LCD display), which can only be switched on or not, depending on the controller status. This is a limit for the flexibility of the controller, because the number of the functions and the modes which can be displayed is a finite number and does not allow to introduce a new function, e.g. with a new name or icon.

Moreover, the user interface in the transmitter units comprises four keys, but at least two of them have no association at all with the display. This makes it necessary to press a combination of keys, even for a certain number of seconds in some cases, to enter in specific programming functions.

At least some of the keys have fixed functions which do not change according to the position in the programming menu.

All these shortcomings make the user interface of the controller unit of the WO'364 not intuitive, friendly and easy to manage for the users.

U.S. Pat. No. 4,819,714 discloses a controlling system for an air conditioning apparatus including a controlling apparatus, a main controller and room controller provided in each room.

The main controller includes a LCD display of a "static" type comprising a number of fixed segments and icons in fixed positions which can be switched on or not depending on controller status. Further, the main controller includes seven different keys able to activate a relatively small number of different functions.

The controller disclosed in US'714 has a rigid structure which renders it not intuitive and easy to manage the programming, or use by a normal user not skilled.

Further, the main controller of US'714 does not disclose a strict functional association between the function displayed temporally in a particular area of the display and the specific key associated to that area of the display.

The Applicant has devised, tested and embodied this invention to overcome these shortcomings which users of conventional programming devices have often complained of, and to achieve further advantages as will be shown hereafter.

SUMMARY OF THE INVENTION

The invention is set forth and characterized in the respective main claims, while the dependent claims describe other characteristics of the main embodiment.

The purpose of the invention is to achieve a device for conditioning (cooling and/or heating) ambient temperatures or more generally ambient parameters, which will allow on the one hand one to develop also diverse and complex setting and programming plans, and yet which on the other hand will be easy to use and quick to understand by substantially anybody.

Another purpose of the invention is to allow anybody to set personalized and diversified air conditioning programs easily and quickly, substantially without risk of errors, with an immediately perceptible confirmation such that the user will have verification, including visual verification, that the settings have been made.

A further purpose is to achieve a setting device with a setting method based on a plurality of menus which can be individually selected and run through by means of unified commands, immediately comprehensible, allowing a continuous interaction with the graphics appearing on the display.

These and other purposes are obtained with an electronic setting device comprising user interface means comprising at least a dot matrix display suitable to allow a continuous interaction with the user, both during setting and also during normal functioning, and of selection/control means consisting of a substantially reduced number of keys or knobs, the function of which are, at least for some of them, immediately perceptible from the indications which appear on the display itself.

In a preferential but not exclusive embodiment, the display is of the dot matrix LCD type.

In another embodiment, the display is of the dot matrix type using LED technology.

With a flexible display of this type, it is possible to display, even in the same position, a substantially infinite number of different letters, icons or numerals, with adjustable dimensions, according to the controller status and the position in the programming menu.

This flexibility permits to identify the specific function of every key or knob at every programming stage, making comprehension and use of the setting device particularly easy.

Moreover, use of a display of this type allows to introduce or modify one or more new functions, even with a new and different name or icon.

The alphanumeric indications which appear on the display are advantageously clear and large, and words which are easy and immediate to understand are used for these indications.

According to an embodiment of the invention, the words which appear on the display are in a language which can be selected by the user, in a setting phase, from among a plurality of different languages.

In a first embodiment, a selection/control unit comprises at least a pair of selection keys/buttons and at least a knob.

The selection keys/buttons inside a menu respectively assume at least the functions of confirming the setting already done, and of returning to a previous step, while the knob (or another pair of keys) allows one to move in the relative menu in one direction or another.

In another preferential embodiment, instead of the knob there is a pair of keys/buttons able to perform the function of "UP" and "DOWN" inside a relative menu.

According to the invention, the keys/buttons have a function which varies in relation to the position in the programming menu, this function being each time displayed on a specific area of the dot matrix type display, this area being associated with a specific key/button.

The setting method of the device according to a preferred embodiment of the invention comprises at least a procedure to select the language to be used, at least a procedure to set the date and time of a clock and at least a procedure to select a timed conditioning program in the ambient to be controlled.

Every setting made, after it has been displayed on the display so that the user can verify and check it, can be confirmed by using the relative confirm key. By using the return key or for time-out, the user goes back to the previous menus or the main state.

The device according to the invention, using the selection/control means appropriately according to the indications which appear on the display on each occasion, allows one to set various conditioning plans and programs according to the user's specific requirements.

These programs can be set manually by the user, or selected from a package of pre-memorized programs; moreover, they can consist of monthly, weekly or daily programs and the same program can be repeated over two or more days.

Within the same day, it is possible to set various temperature profiles, for example hour by hour, or identified by periods of time characterizing and defining one or several individual different events.

Every setting is represented on the display clearly and intelligibly, also graphically, and can be, as aforementioned, confirmed or modified in an equally easy and immediately comprehensible manner.

BRIEF DESCRIPTION OF THE DRAWINGS

These and other characteristics of the invention will become clear from the description of a preferential embodiment, given as a non-restrictive example, with reference to the attached drawings wherein:

FIGS. 5–11 show some examples of the programming of the device according to the invention;

DETAILED DESCRIPTION OF PREFERRED EMBODIMENT

Figure 1:
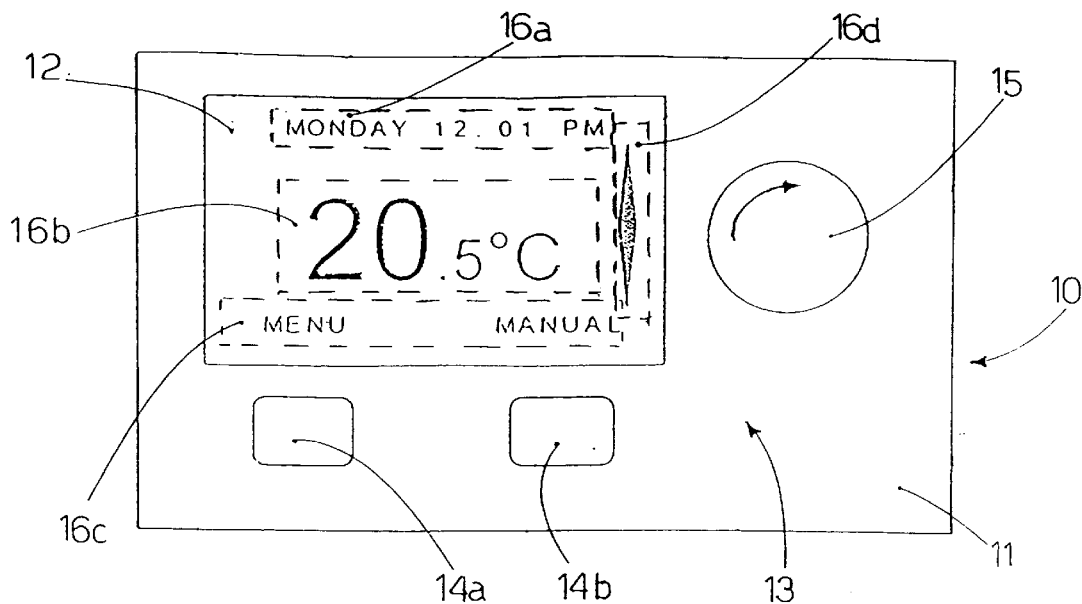
FIG. 1 is a schematic view of a setting device according to the invention.

With reference to FIG. 1, an electronic device for setting and conditioning ambient temperatures, particularly for domestic applications and the like, is indicated generally by the reference number 10.

It comprises a supporting panel 11 on the front of which there is a display 12 and selection/control means 13; the latter comprise, in this case, two buttons or keys, respectively a confirm button 14a and a return button 14b, and a knob 15.

According to a variant which is not shown here, instead of the knob 15 there may be two buttons or keys having respectively an "UP" function and a "DOWN" function; they are used, for example, to move in one direction or the other along a selection menu.

The display 12 is divided, in this case, into four areas of display, respectively 16a, 16b, 16c and 16d; their specific function will be explained later.

Figure 12:
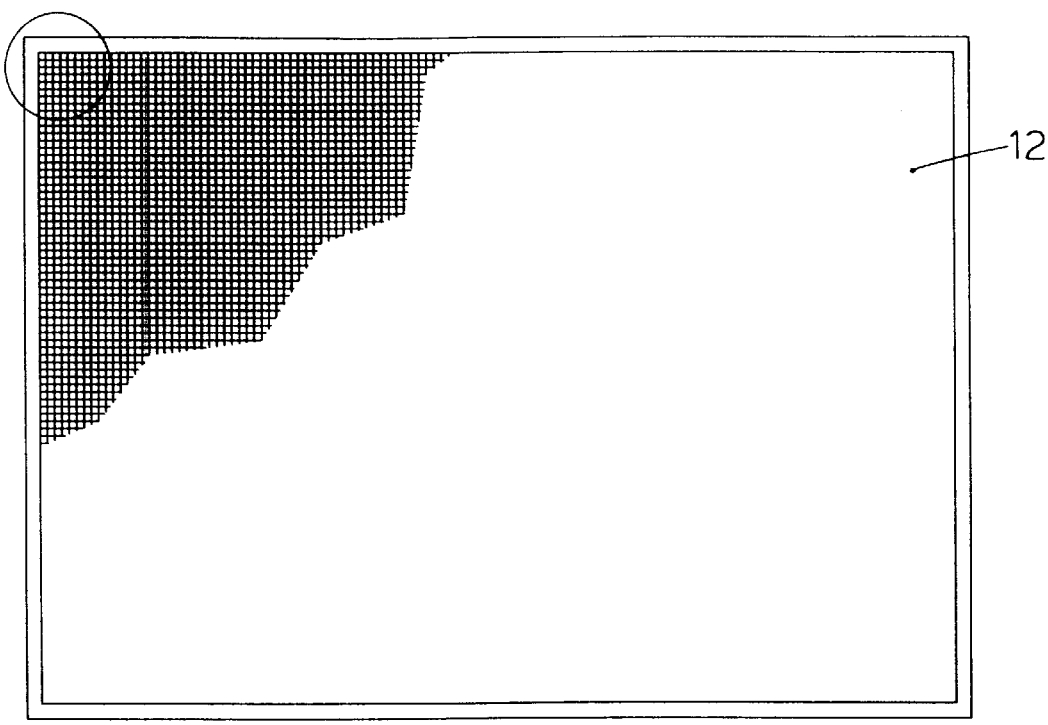
FIGS. 12 and 13 shows an example of a dot matrix type display of the present invention.
Figure 13:
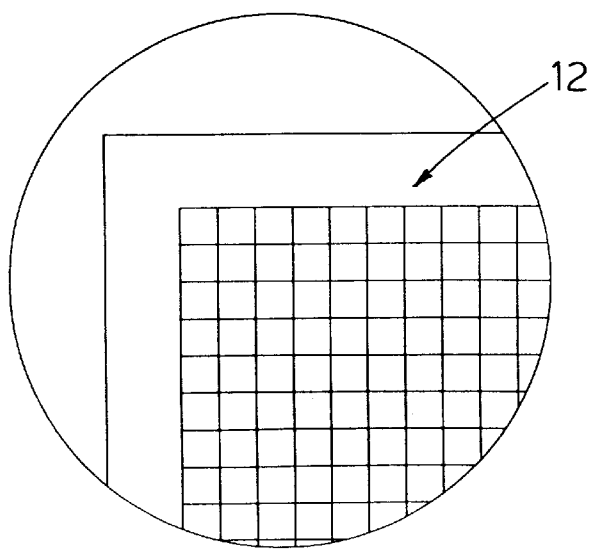

The display 12 is a dot matrix type, for example a dot matrix LCD display, as shown in FIGS. 12 and 13.

This kind of display 12 comprises a high number of rows and columns, that define single elements which can be selectively switched on or not, according to the alphanumeric indications, icons or images to be displayed as required by the program and by the selection made by the user.

The more "rows" and "columns" the display has, the more flexible it is.

This flexibility allows one to make completely interactive the selection and the programming of the device 10 by a user; in fact, this kind of display permits one to show, in the same area of the display itself, not only alphanumeric indications, but also icons, graphs or numerals which can be different from each other depending on the position in the programming stage and on the selection of the user.

Moreover, the display 12 allows one to functionally associate an indication which appears on a specific area of the display 12 with the specific key/button 13 which is closer to this specific area, and allows one to vary this indication in the same specific area depending on the position in the programming stage.

Figure 2:
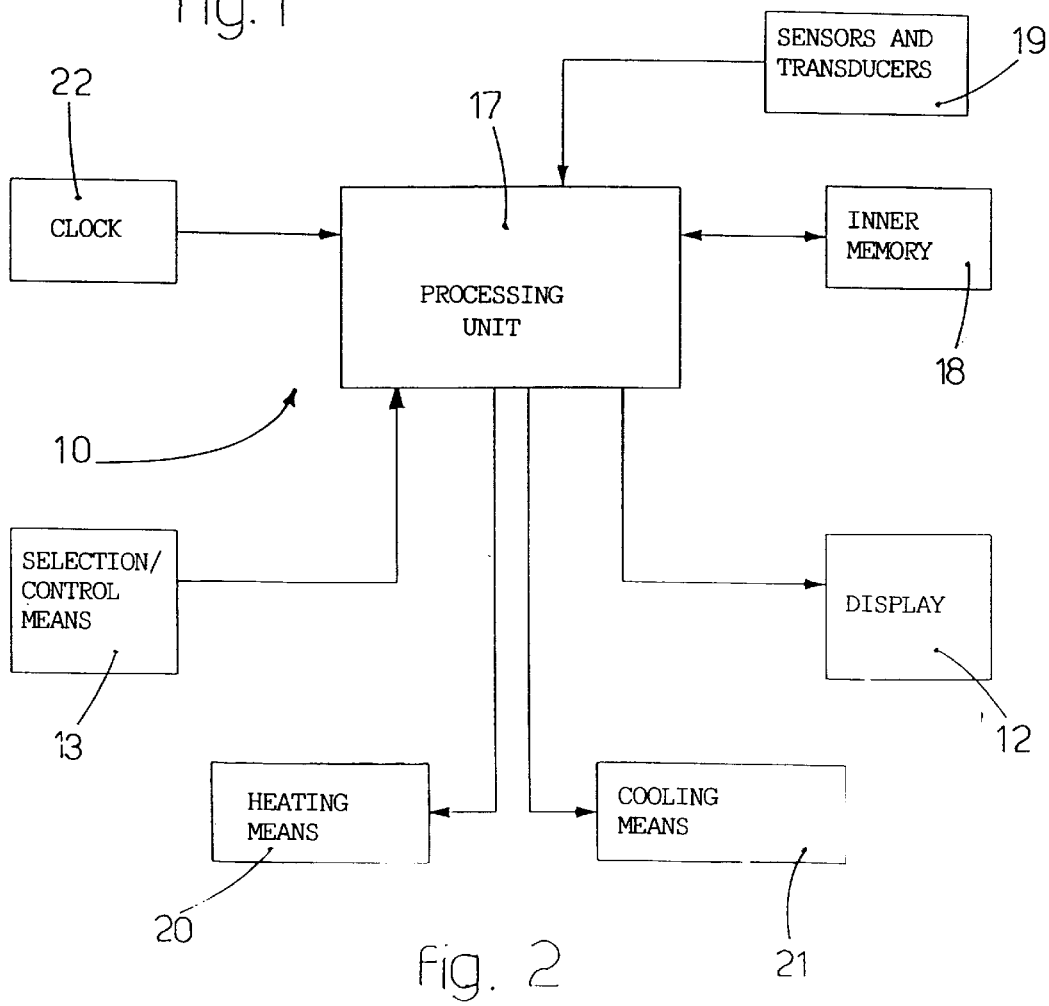
FIG. 2 is a simplified block diagram of the functional structure of the device shown in FIG. 1.

The inner structure of the device 10 is shown in a simplified, schematic form in FIG. 2. The structure comprises a processing unit 17 connected to at least a memory 18 in which at least a plurality of pre-set programs of temperature conditioning are memorized.

The processing unit 17 is able to receive input signals from sensors/transducers 19 which detect the temperature of the ambient to be conditioned, and to send output signals to command heating means 20 and/or cooling means 21 to regulate the ambient temperature according to the commands made on the device 10.

The processing unit 17 is associated with at least a clock 22 and is also able to receive and process the commands transmitted by a user through the selection/control means 13 and to command the desired graphic and alphanumeric displays which appear on the display 12.

In the device 10 according to the invention, every selection and command can be set by acting only on the buttons 14a and 14b and the knob 15, and can be verified by means of the specific indications appearing in the relative areas 16a–16d of the display 12.

The indications on the display 12 appear in alphanumeric form (or icons, graphs or numerals) in the pre-selected language, they are large and can be immediately perceptible and understood.

The areas 16c and 16d of the display 12 display on each occasion which functions are accessed by using, respectively, the buttons 14a, 14b located in a corresponding position and the knob 15, so that programming can occur interactively without requiring the user to read instruction booklets or the like.

Figures 3, 4:
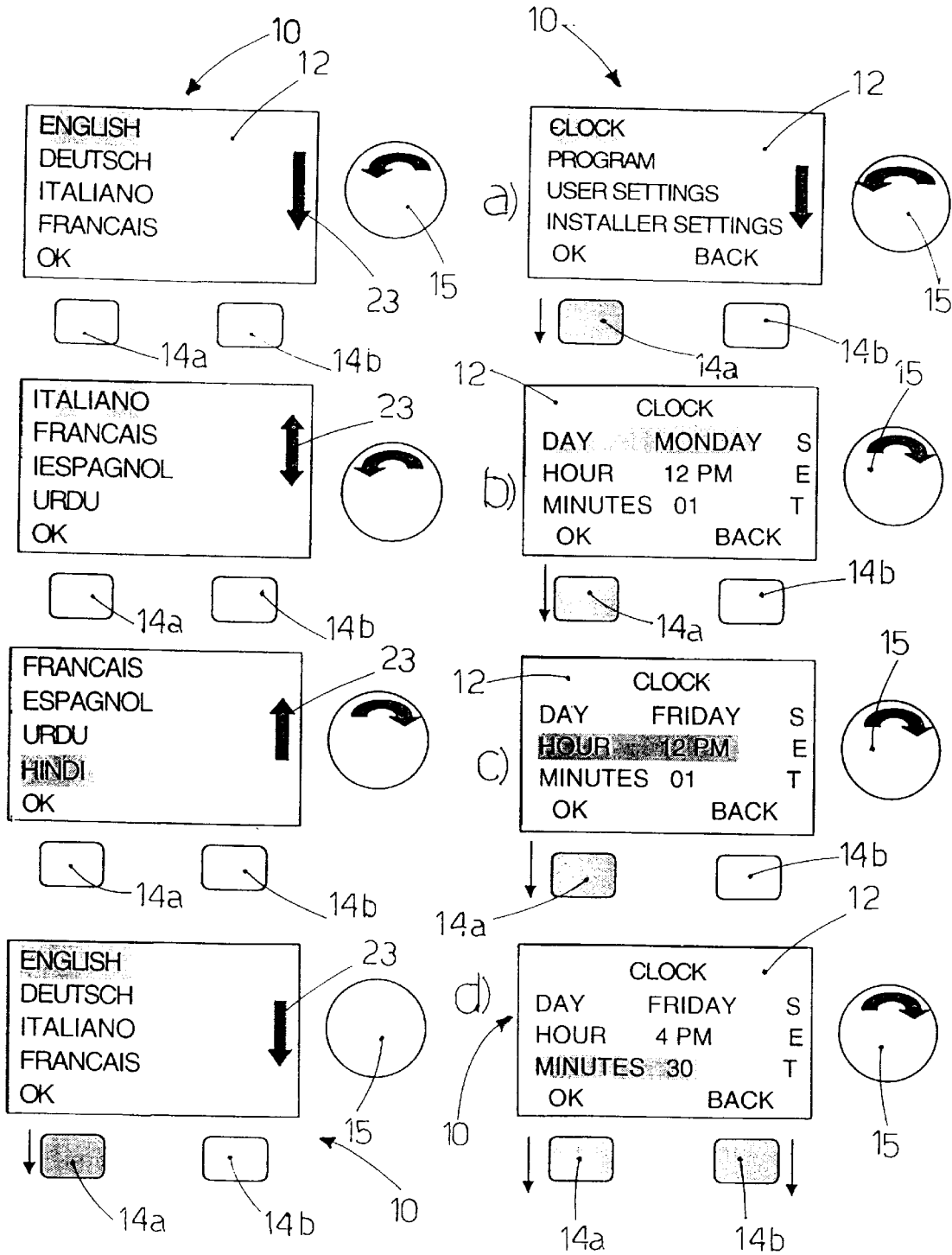
FIG. 3 shows the procedure to select the language used for the relative display of figures and numbers on the display.
FIG. 4 shows the procedure to set the date and time.

When the device 10 is switched on, as shown in FIG. 3, in a preferred embodiment of the invention, a procedure to select the language is automatically started; by turning the knob 15 in one direction or the other, it is possible to run through a menu containing a plurality of languages which can be selected.

An arrow 23 on the side of the display 12, in the relative zone 16d, indicates that it is possible to run through the menu in both directions, or the end or beginning of the menu.

When the language required is reached, it is selected by pressing the confirm button 14a, identified by the indication "OK" which appears in a corresponding position in the zone 16c of the display 12.

Having chosen the language, the main menu appears on the display 12 (FIG. 4a). By selecting the "CLOCK" option, a procedure is started to set the date and time on the clock 22, shown in FIGS. 4b–4d.

As can be seen in the Figure, the knob 15 is used to run through the menu relating to each selection, for example the days of the week when the word "DAY" flashes (if the language selected is English) (FIG. 4b), the hours when "HOUR" flashes (FIG. 4c), the minutes when "MINUTES" flashes (FIG. 4d).

The word "SET" in the zone 16d of the display 12 shows the possibility of using the knob 15 to set the relative option to be chosen, while the words OK" and "BACK" in zone 16c in correspondence with the respective buttons 14a and 14b clarify the functions of the buttons in an explicit manner, facilitating the setting operations.

Once the date and time have been set, they appear constantly on the display 12, in the relative zone 16a, under normal working conditions of the setting device 10.

In zone 16b, on the contrary, the current temperature of the room to be conditioned is constantly shown.

Figures 5, 6:
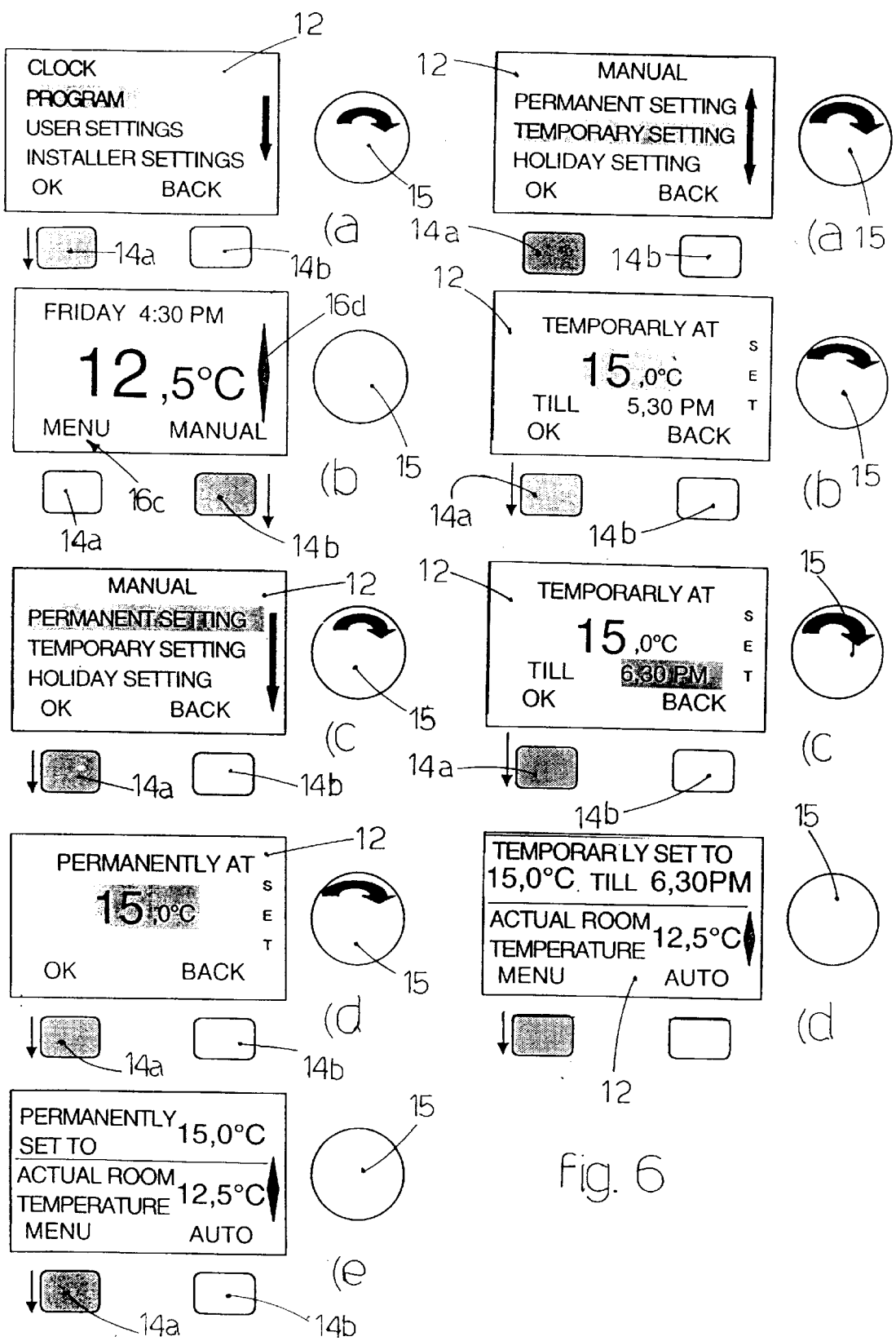

By selecting "PROGRAM" from the main menu, the device 10 offers the option of setting manually or from the menu (FIG. 5a).

By selecting the manual option from the default configuration (FIG. 5b), a sub-menu with three options is displayed, respectively "PERMANENT SETTING", "TEMPORARY SETTING" and "HOLIDAY SETTING".

The "PERMANENT SETTING" option, as can be seen in FIGS. 5c–5d, allows one to define a desired temperature, acting up or down with the knob 15 (note that for every setting to be made with the knob 15 in zone 16d of the display 12 the indication "SET" appears). When the desired temperature has been set, it can be confirmed by pressing button 14a.

In the upper part of the display 12 the setting made is then displayed, while the lower part of the display 12 shows the actual ambient situation of the room.

Since in the case shown here the actual temperature is less than the temperature set by the user, in zone 16d of the display 12 an indication appears to show the heating has been switched on, shown in this case by a colored rhombus.

On the contrary, by selecting the "TEMPORARY SETTING" option from the menu (FIG. 6a), it is possible to set first a desired value of temperature (FIG. 6b), then a time (FIG. 6c) when the user wants the setting to finish.

These operations are always made by using the knob 15 by means of which the values, first temperature and then time, are modified, for example continuously or at default intervals (for example 0.5° C. for the temperature and 15 minutes for the time). When setting is finished, it can be confirmed by the user (key 14a—"OK"; FIG. 6c); then, the final display (FIG. 6d) allows one to verify that the setting is correct.

Figure 7:
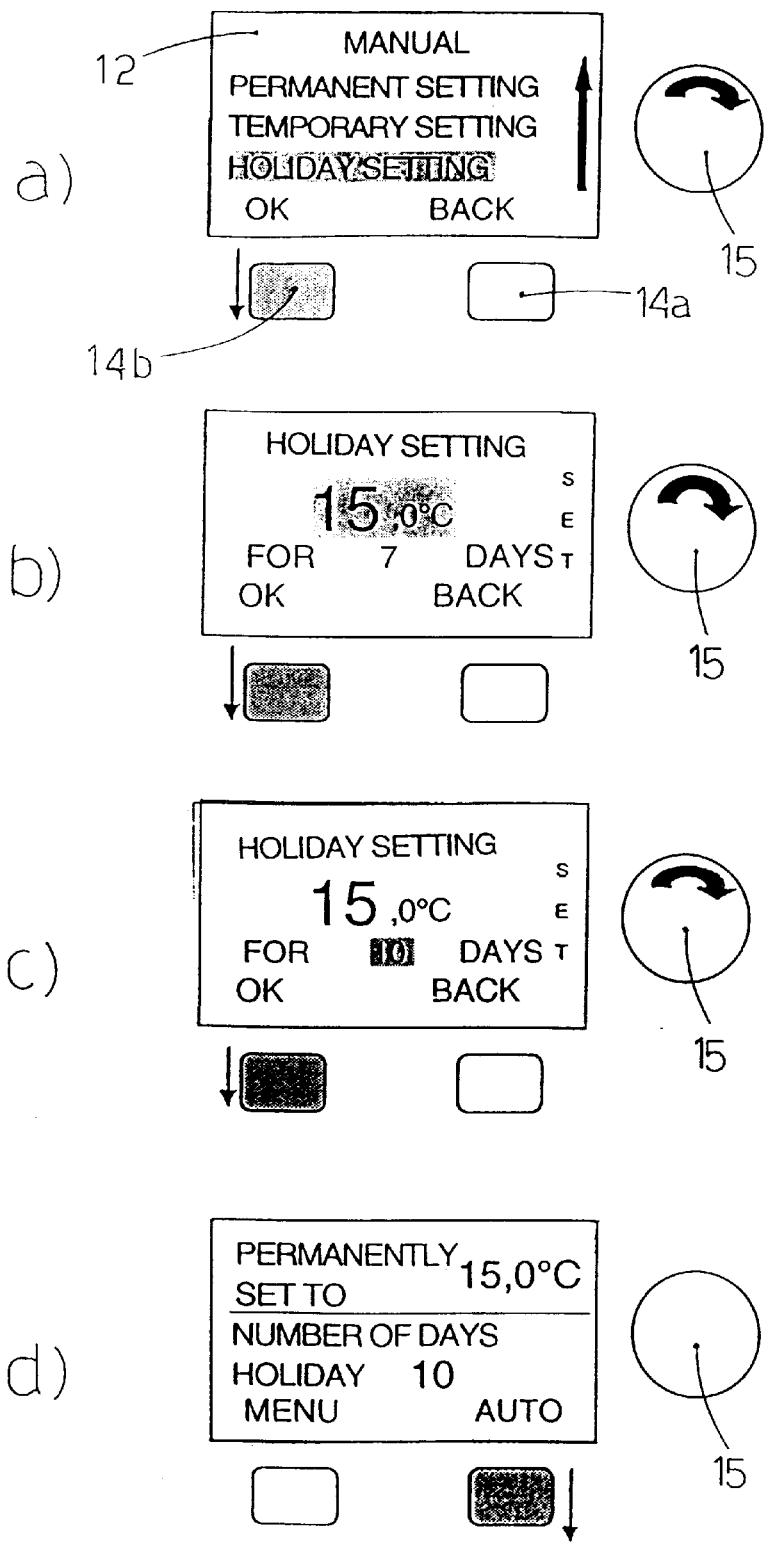

Finally, by selecting the "HOLIDAY SETTING" option (FIG. 7a), it is possible to set a desired temperature (FIG. 7b) to be maintained consecutively for a desired number of days (FIG. 7c).

To set a daily or weekly conditioning program, the display 12 (FIG. 8a) shows a sequence of various options of packages which can be selected individually.

In this case, it is possible to select a first option which concerns all the days of the week (MON–SUN), to differentiate week days (MON–FRI) from the weekend (SAT–SUN), and to set a differentiated program for every day of the week (MON–TUE . . . ).

In this last case (FIGS. 8b–8e), it is possible to set a conditioning program comprising a plurality of time blocks, distinct and distributed over the whole day, which can each be combined with a desired temperature; this combination of time period and temperature is called, in this case, "event".

Figure 8:
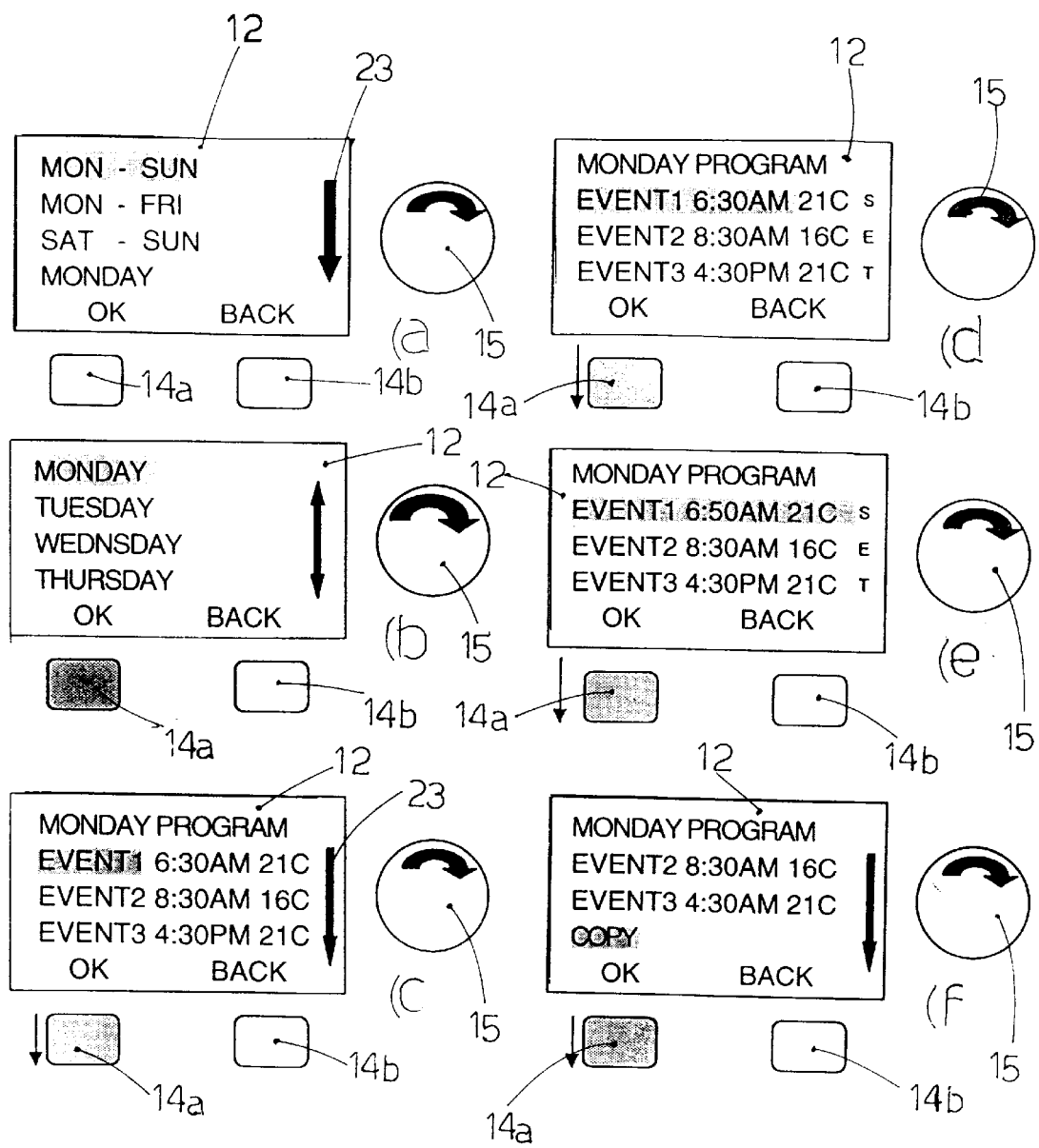

Once the program for a single day has been set, it is possible to reproduce it for another day, if so desired, by using the "COPY" option (FIG. 8f).

As can clearly be seen from the attached Figures, each setting is always guided by the clear and immediate indications which appear on the display 12, which advise the user intuitively and interactively, during the setting step, which selection/control means 13 have to be used and how.

It is also clear how the means 13 have functions which vary in relation to the position in the programming menu.

For the knob 15, for example, in zone 16d of the display 12 there is always an arrow 23 which tells the user to run through the menu, or the word "SET" when he has to select values to be set.

For the keys 14a, 14b, zone 16c of the display 12 always shows either "OK" if the user wants to confirm the setting or "BACK" if he wants to go back.

By selecting the option "USER SETTING" (FIG. 9a) from the main menu shown in FIG. 4a, the user can set various alternatives in how the device 10 works and in how it displays information.

Figure 9:
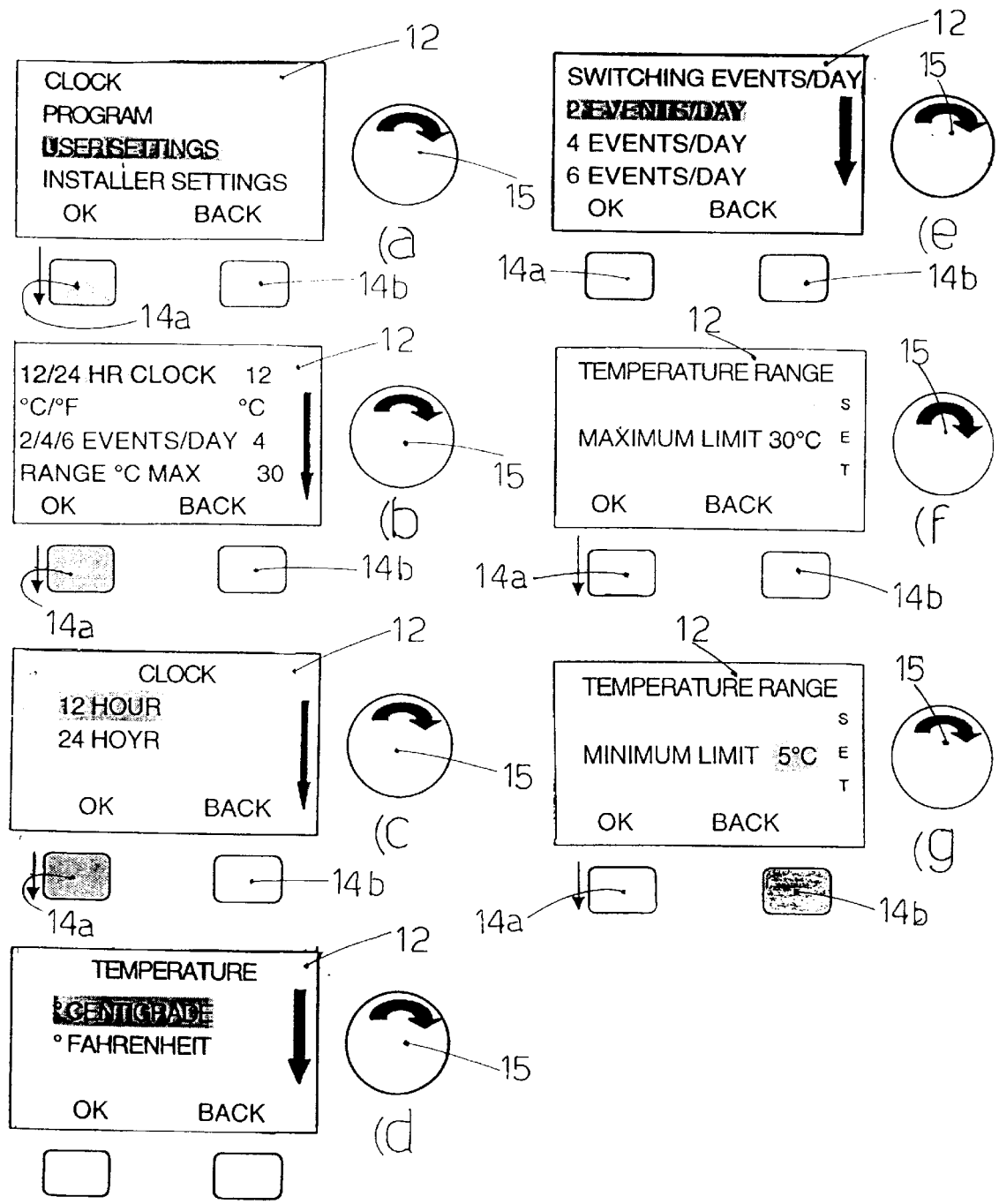

Some examples of these are, for example, the way the time is displayed (FIGS. 9b, 9c), in which scale the temperature is expressed (FIG. 9d), the number of possible "events" in the course of a day (FIG. 9e), the upper and lower limits to which the temperature can be taken (FIGS. 9f, 9g).

The main menu shown in FIG. 4a provides another sub-menu ("INSTALLER SETTINGS"). This gives the installer the possibility to introduce, for example, a password which allows access, for example, to the inner memory 18 or the processing unit 17 to introduce or modify parameters. The sub-menu is not shown in detail in the Figures.

The further variant shown in FIG. 10 allows one to represent graphically the set development of the temperature during the course of the day, giving the user a clear verification of the setting made.

Finally, in the variant shown in FIG. 11, a further sub-menu allows the user to select a desired pre-defined program, among those memorized by default in the inner memory 18, in the event that the user does not intend to set a personalized program manually.

Although the invention has been described here with reference to a preferred embodiment, it is obvious that modifications and variants can be made thereto, but these shall all come within the field and scope of the invention.

What is claimed is:

1. Electronic device operable by a user for regulating and controlling ambient parameters such as ambient temperature, comprising:
    a processing unit;
    a display device for displaying selectable control functions and setting parameters related to a set of desired ambient conditions; and
    a selection/control means for selecting by the user at least one control function or setting parameter from a set of control functions or setting parameters,
    wherein the display device comprises an interactive display configured to display the set of control functions or setting parameters, each of which is selectable by the selection/control means, wherein the interactive display is further controllable to display at least one adjustable function or parameter corresponding to a selected control function or setting parameter, the adjustable function or parameter being adjustable by the same selection control means.

2. Electronic device as in claim 1, characterised in that said selection/control means comprises a predetermined number of means operable selectively for confirming a selection, returning to a previous step and selecting control functions or setting parameters from a selectable set of control functions and setting parameters.

3. Electronic device as in claim 2, characterised in that said selection/control means comprises a pair of buttons operable to confirm a selection and to return to a previous step and a knob to select a control function or a setting parameter from a selectable set of control functions and setting parameters.

4. Electronic device as in claim 2, characterised in that said selection/control means comprises a first pair of buttons operable to confirm a selection and to return to a previous step and a second pair of buttons to select a control function or a setting parameter from a selectable list of control functions and setting parameters.

5. Electronic device as in claim 1, characterised in that said display device comprises a dot matrix liquid crystal display.

6. Electronic device as in claim 1, characterised in that said display device comprises a dot matrix display of a LED type.

7. Electronic device as in claim 1, characterized in that said display device includes means for displaying alphanumeric characters, graphs, icons or numbers of predetermined size.

8. Electronic device as in claim 1, characterised in that said display device includes a plurality of display zones configured to display predetermined control functions or setting parameters selectable by the user.

9. Electronic device as in claim 8, characterised in that one of said zones is configured to display time and date.

10. Electronic device as in claim 8, characterised in that one of said zones is configured to display ambient temperature.

11. Electronic device as in claim 8, characterised in that one of said zones is configured to display a graphical representation of a direction corresponding to a relative position along a set of control functions or setting parameters selectable by the user from a predetermined point of reference on said display device.

12. Electronic device as in claim 11, characterised in that said direction correspond to up or down.

13. Electronic device as in claim 11, characterised in that said graphical representation indicates the end or the beginning of said set.

14. Electronic device as in claim 8, characterised in that one of said zones is configured to display an indication that a heating or cooling unit is activated.

15. Electronic device as in claim 1, characterised in that it comprises a sensor for detecting an ambient condition.

16. Electronic device as in claim 1, characterised in that it comprises a memory for storing programs of ambient conditioning.

17. Electronic device as in claim 1, characterised in that it comprises an output for controlling heating and cooling units.

18. Electronic device as in claim 1, characterised in that it comprises a clock for indicating at least time and date on said display device.

19. Electronic device as in claim 1, characterised in that one of said setting parameter selectable by the user is the language of the displayed information shown by said display device.

20. Electronic device as in claim 1, characterised in that one of said setting parameters selectable by the user is date and time.

21. Electronic device as in claim 1, characterised in that one of said control functions selectable by the user is manual control of heating or cooling by setting a definite temperature.

22. Electronic device as in claim 21, characterised in that the manual control of heating or cooling is selectable without time limits.

23. Electronic device as in claim 21, characterised in that manual control of heating or cooling is selectable with time limits.

24. Electronic device as in claim 23, characterised in that manual control of heating or cooling is selectable with time limits for the period of one day.

25. Electronic device as in claim 23, characterised in that manual control of heating or cooling is selectable with time limits for the period of one day repeating over a period of one week.

26. Electronic device as in claim 23, characterised in that manual control of heating or cooling is selectable with a plurality of time limits varying over the period of one week.

27. Electronic device as in claim 1, characterised in that one of said setting parameters includes a set of different display formats to be selected by the user to determine the appearance of the displayed information.

28. Electronic device as in claim 1, characterised in that one of said setting parameters includes a set of pre-defined programs stored in the memory and selectable by the user.

29. Method for regulating and controlling ambient parameters such as ambient temperature, comprising:

displaying on a display device a plurality of selectable control functions and setting parameters related to a set of desired ambient conditions;

selecting through a selection/control unit at least one control function or setting a parameter from a set of control functions or setting parameters;

modifying the selected control functions or setting parameters through the selection/control unit;

inputting the modified control functions or setting parameters to a processor unit for controlling a heating or cooling mechanism to achieve the ambient temperature according the selection made by the user;

displaying on the display device for each selection made by the selection/control unit the set of control functions or setting parameters; and displaying on the display device the modified selected control functions or setting parameters in accordance with the selection/control unit.

30. Method as in claim 29, wherein said display device comprises a dot matrix liquid crystal display.

31. Method as in claim 29, wherein said display device comprises a dot matrix display of a LED type.

32. Method as in claim 29, further comprising the step of selecting date and time as one of said setting parameters.

33. Method as in claim 29, further comprising the step of selecting a program for manual heating or cooling as one of said setting parameters.

34. Method as in claim 29, further comprising the step of selecting a display format for the information appearing on said display device.

35. Method as in claim 29, further comprising the step of selecting a language from among a set of different languages as one of said setting parameters.

36. The electronic device of claim 1, wherein the display device is configured to alphanumerically display control functions or setting parameters.

37. The electronic device of claim 1, wherein the interactive display device is further controllable to alphanumerically display at least one function or parameter.

38. The method of claim 29, wherein the step of displaying on the display device for each selection made by the selection/control unit further includes the step of alphanumerically displaying the set of control functions or setting parameters.

39. The method of claim 29, wherein the step of displaying on the display device in accordance with the selection/control unit further includes the step of alphanumerically displaying the modified selected control functions or setting parameters.

* * * * *